Figure 7:
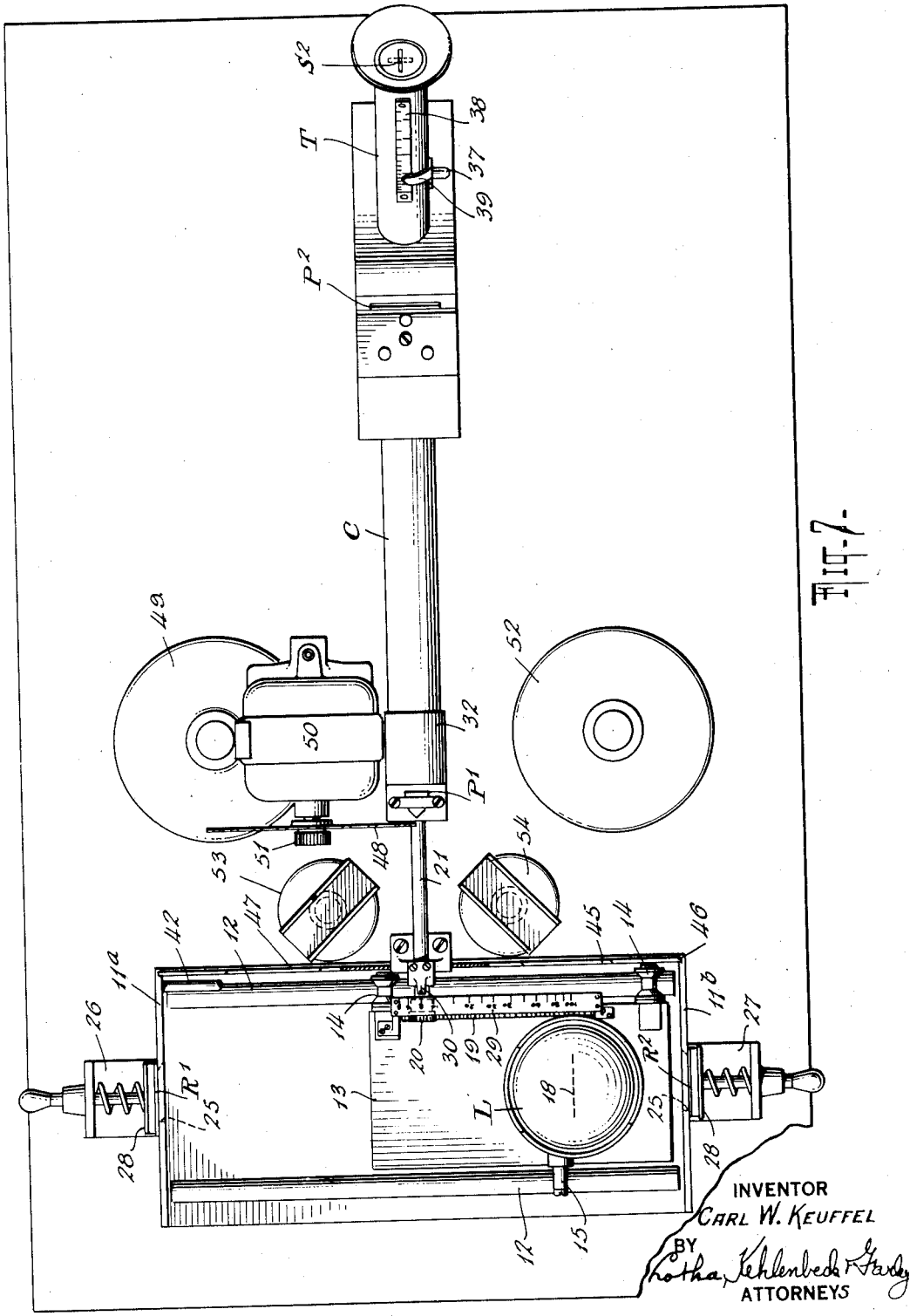

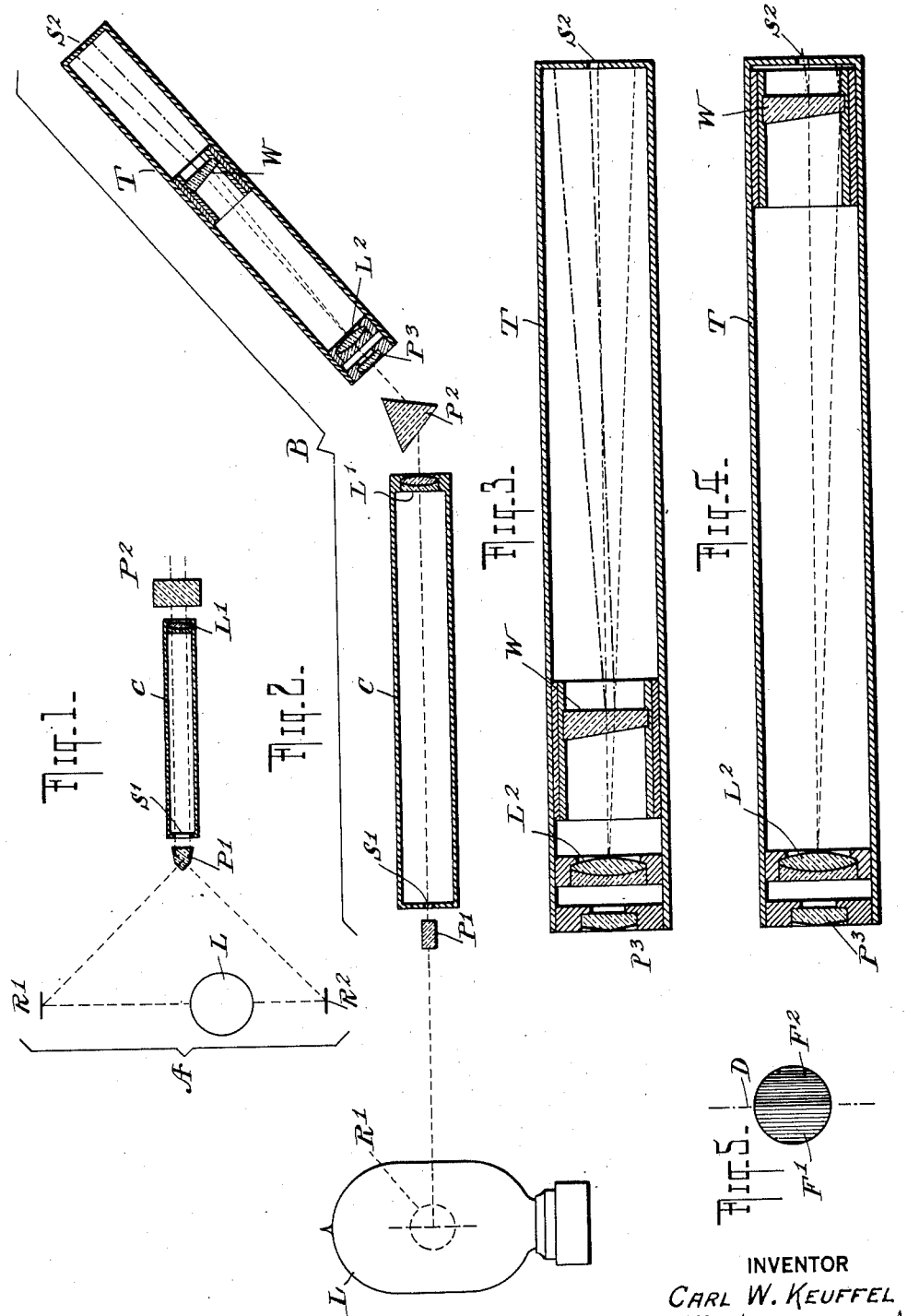

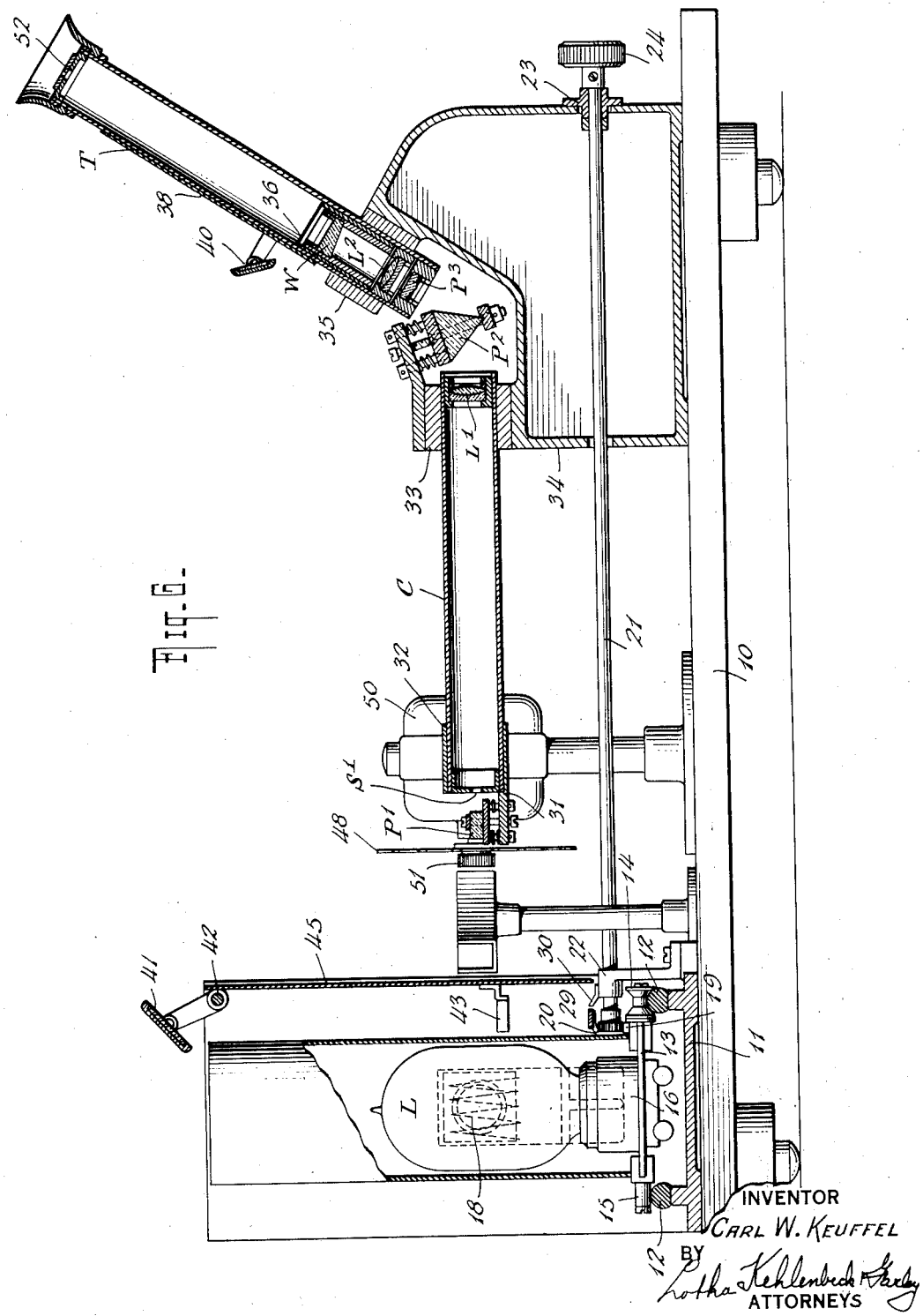

Aug. 28, 1928.

C. W. KEUFFEL 1,682,572

OPTICAL INSTRUMENT

Filed Oct. 15, 1925 4 Sheets-Sheet 3

INVENTOR
CARL W. KEUFFEL
BY
Lotha, Kehlenbeck & Hardy
ATTORNEYS

Aug. 28, 1928.
C. W. KEUFFEL
1,682,572
OPTICAL INSTRUMENT
Filed Oct. 15, 1925    4 Sheets-Sheet 4
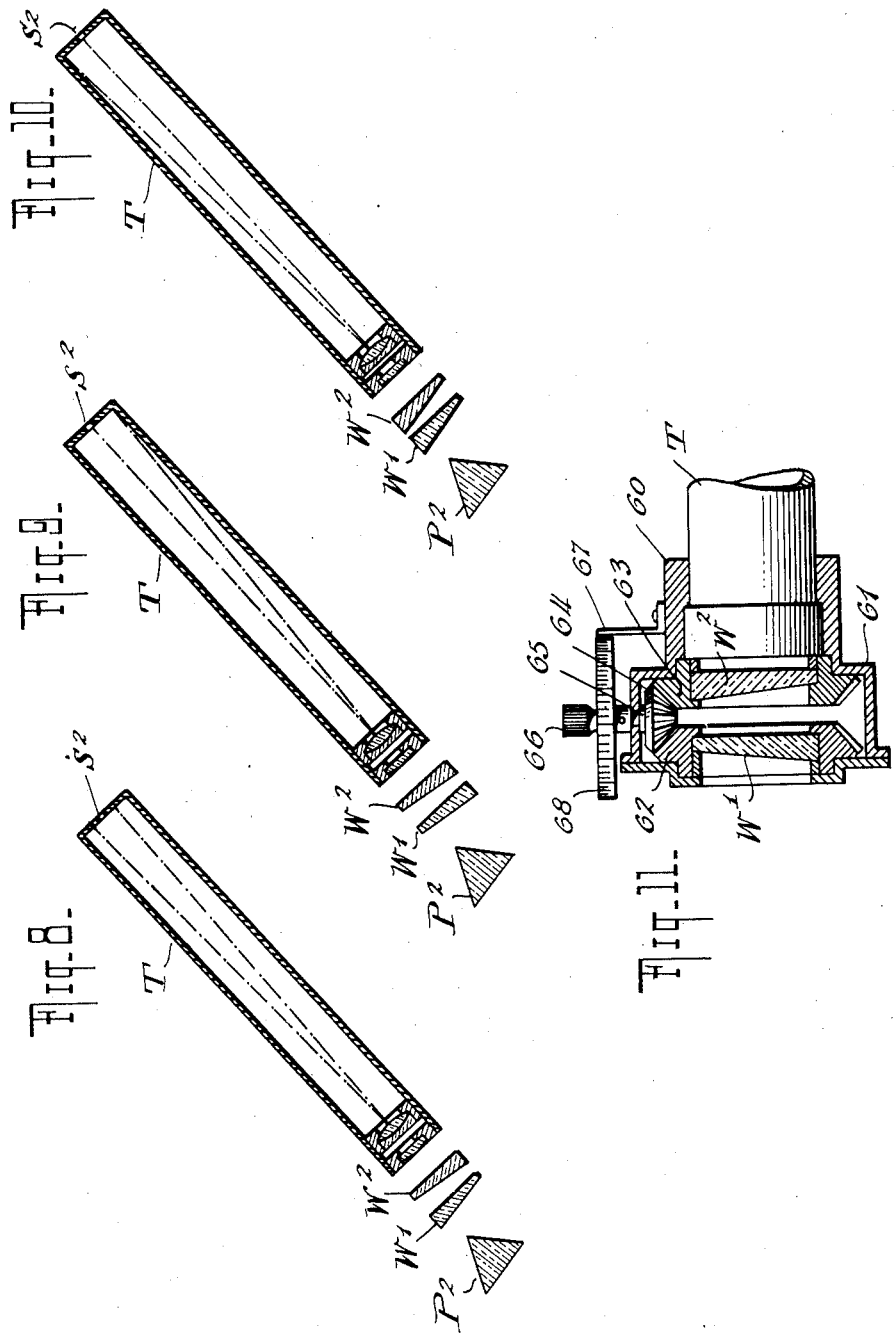
INVENTOR
CARL W. KEUFFEL
BY
Lotha, Kehlenbeck & Farley
ATTORNEYS Patented Aug. 28, 1928.

1,682,572

UNITED STATES PATENT OFFICE.

CARL W. KEUFFEL, OF WEEHAWKEN, NEW JERSEY, ASSIGNOR TO KEUFFEL AND ESSER COMPANY, OF HOBOKEN, NEW JERSEY, A CORPORATION OF NEW JERSEY.

OPTICAL INSTRUMENT.

Application filed October 15, 1925. Serial No. 62,502.

This invention relates to optical instruments and particularly to spectrophotometers and the component parts thereof. Although there is an extensive field for the application of such instruments in the industries and many different types thereof have been devised, their use has practically been limited to research laboratories because most of the types heretofore produced could be used successfully only by those having an advanced scientific training, while such instruments as were adapted to the skill of men having only average training could be manufactured and sold only at a relatively high price.

In order that a spectrophotometer be suitable for industrial purposes and for the average college laboratory it must meet the following requirements: 1st, The instrument must be susceptible of being manufactured and sold at a relatively low price; 2nd, the construction of the instrument must be based not only on correct scientific but also sound mechanical principles and design so that the results of observations will be within the required limits for precision and accuracy; 3rd, it must be sturdy and durable; 4th, the movable parts of the instrument must be so constructed that settings and readings can be made quickly and easily with a minimum of exertion on the part of, and fatigue to, the operator; 5th, the results of observations made with the instrument must be directly obtainable from suitable indicia without necessitating mathematical computations to obtain the required data, so that such data can be obtained and recorded by persons of average skill; and 6th, the construction of the instrument and particularly what may be termed the mechanical parts thereof, as distinguished from the optical elements such as lenses and prisms, must be such that the necessity for mathematical accuracy in the machining of the such parts will be obviated.

It is the principal object of this invention to provide a spectrophotometer which will fully meet the above enumerated requirements.

A further object is to improve upon the construction of the spectrometer and photometer which not only form component parts of a spectrophotometer, but are also separately adapted for extensive use.

These and other objects will appear more fully to one skilled in the art to which the invention relates, from the following more detailed description and by reference to the accompanying drawings forming a part hereof, and wherein Fig. 1 is a diagrammatic plan view of a portion of a spectrophotometer embodying my invention showing the arrangement of the members; Fig. 2 is a diagrammatic side elevation of the optical system; Figs. 3 and 4 are diagrams of a portion of the spectrometer showing different positions of the optical wedge; Fig. 5 is a diagrammatic view of the photometric field; Figs. 6 and 7 are a side elevation and a plan respectively of my improved instrument; Figs. 8, 9 and 10 are views similar to Figs. 3 and 4 showing a different form of the invention and Fig. 11 is a detail side elevation of an adjusting device for use with the form of construction shown in Figs. 8 to 10 inclusive.

The instrument will first be described by reference to the diagrammatic views of Figs. 1 to 5 inclusive in order that the underlying scientific principles of the construction may be more readily understood.

As shown in Figs. 1 and 2 the instrument consists of a photometer designated generally by the reference character A, and a spectrometer designated by the reference character B. A portion of the radiant energy or light from any suitable source, as for example, the lamp L reflected by the reflecting surfaces $R^1$, $R^2$, is directed by the prism $P^1$, in two substantially parallel juxtaposed beams through the entrance slit $S^1$ of the collimator C and passes through the collimator objective $L^1$. The parallel beams as they pass through the dispersion prism $P^2$ are dispersed so that, in accordance with the well known properties of such prisms, the rays of different color present in the light beams will be deviated at different angles according to the wave length or frequency of each particular light ray; the resulting dispersed beam being brought to a focus at the ocular slit $S^2$ of the telescope T by the telescope lens or objective $L^2$.

A bi-prism $P^3$ is interposed between the dispersing prism $P^2$ and the telescope objective $L^2$ to form a divided field of the type shown in Fig. 5; one half of the field as for example $F^1$ is illuminated by the beam of light reflected by the surface $R^1$ and the other half $F^2$, of light from the surface $R^2$. By varying the brightness or intensity of one or both of the beams which compose the two halves of the field, the dividing line D will disappear when the intensities of the beams are made equal. A wedge shaped piece of optical glass W is interposed between the objective $L^2$ and the ocular slit $S^2$ and is movable longitudinally of the telescope. The wedge W deflects the rays of light upwardly, so that instead of the rays passing through the telescope substantially parallel to the axis thereof, they are inclined to the axis as illustrated diagrammatically by the dot and dash lines in Figs. 3 and 4. As the rays which pass through the telescope are deflected upwardly by the wedge in the constructional example illustrated in Figs. 2 to 4 inclusive, any rays which would lie above the optical axis would not be directed to the slit $S^2$, no matter to what position the wedge might be moved, therefore the dispersion prism $P^2$ is adjusted so that the dispersed beam will be projected by the telescope objective $L^2$ slightly below said optical axis, as shown by the dotted lines in Figs. 3 and 4.

With the wedge in the position shown in Fig. 3, the red rays are brought into coincidence with the ocular slit, while the remaining rays are lost within the telescope. When the wedge is moved to the position shown in Fig. 4, the violet rays pass to the ocular slit. By moving the wedge between the extreme positions shown in Figs. 3 and 4, any particular section of the spectrum may be investigated by the observer, depending upon the position of the wedge. If the telescope is provided with a scale having marks to indicate wave lengths, and the wedge with a co-operating pointer, or vice versa, the wave length of the light ray under investigation may be immediately determined by a direct reading.

In order to compare the brightness of the two beams of light reflected by the surfaces $R^1$, $R^2$, the light source or lamp L of the photometer is moved between the two surfaces until the dividing line D of the photometric field disappears. By providing the photometer with a pointer and a scale, divided to indicate ratio of the squares of the distances of the lamp from the reflecting surfaces $R^1$, $R^2$, the intensity or brightness of the reflected beam under investigation may be determined by a direct reading.

Having explained the principles upon which the construction of my improved spectrophotometer is based, I will now describe the constructional details of the embodiment shown in Figs. 6 and 7. The numeral 10 indicates a suitable base or support upon which is mounted, adjacent to one end thereof, a U-shaped bracket consisting of a bottom 11 and side walls $11^a$, $11^b$. The bottom 11 of this bracket is provided with a pair of parallel spaced rails 12, upon which the lamp carriage 13 is slidably mounted; rollers 14, 15 preferably being provided for supporting the carriage on said rails. A lamp socket 16 secured on said carriage is adapted to receive the lamp L, the filament 18 of which is arranged perpendicular with the rails 12 and parallel to the parallel planes of the reflecting surfaces $R^1$, $R^2$. For convenience in moving the lamp between the surfaces $R^1$, $R^2$, I provide the lamp carriage 13 with a rack 19, in mesh with a pinion 20, secured to a shaft 21. The shaft 21 is mounted in suitable bearings, as at 22, 23, and has its front end provided with a knurled operating handle 24. The side walls 11, $11^a$ are coated, or otherwise constructed, to be practically non-reflecting and are provided with the apertures 25 arranged in alignment with each other and the lamp filament. Secured to the side walls, on the outer faces thereof, are the standard and sample holders 26, 27, each of which is provided with a spring pressed follower 28. Upon placing within one of the sample holders, as for instance the holder 26, a suitable standard such as a block of magnesium carbonate which is usually taken as a standard for 100% reflection, and placing within the other holder 27, a sample, the reflective power of which it is desired to examine, the amount of light reflected by each surface can be made equal by moving the lamp as required. For convenience in determining the comparative intensity, the photometer is provided with a scale and an index or pointer. As shown, the scale 29, graduated to indicate percentages or reflection ratios, is secured to the carriage 13 and is so located that the ratio of unity, or 100%, will coincide with the pointer or index 30 when the lamp is midway between the walls $11^a$, $11^b$.

A portion of the light reflected from the surfaces $R^1$, $R^2$ of the objects placed within the holders 26 and 27 is collected by the ray directing prism $P^1$, clamped upon a stand 31 a short distance from the entrance slit $S^1$ of the collimator C, and such light is directed through the slit $S^1$ to the collimator lens or objective $L^2$.

The collimator may be supported in any suitable manner, as for instance, by a pair of sleeves 33, secured to a bracket 34, the latter being attached to the front end of the base 10.

The usual dispersion prism $P^2$ is mounted between the adjacent ends of the collimator and telescope and may be supported in any suitable way. The position of the parts are preferably such that the spectrometer telescope T, as shown in Fig. 7, is extended upwardly at an angle to the horizontal so as to bring the eyepiece in the most convenient and comfortable position for observation, the telescope being supported in any suitable manner as by means of a sleeve 35 mounted on the bracket 34.

Any suitable mechanical expedients may be employed for mounting, within the lower end of the telescope, the bi-prism $P^3$ and the telescope objective $L^2$.

Slidably mounted within the outer sleeve of the telescope is a sleeve 36 in which is fixed the wave length wedge W, said sleeve being provided with a finger piece 37 which projects through an elongated slot in the outer sleeve 36. The outer sleeve is provided with a fixed scale, indicated at 38, graduated to indicate wave lengths, and a pointer or index 39 movable with the inner sleeve, co-operates with said scale to indicate the wave length of the particular light ray brought into coincidence with the ocular slit $S^2$ for any particular position of the sleeve 36 and wedge W.

For convenience in making readings, a reflecting mirror 40 may be mounted on the upper side of the telescope so that the observer may make the readings indicated by the scale 38 and index 39 wihout having to change his position. A similar reflecting mirror 41 is preferably provided for the photometer scale, which mirror may be secured midway of a rod 42 extending between the side walls $11^a$, $11^b$, of the lamp supporting bracket. A magnifying lens 43 may also be provided between the photometer scale 29 and the mirror 41 to enable the readings of the photometer settings to be made more easily. In order to shield the eyes of the observer from the direct rays from the lamp L, I prefer to place a shield 45 in front of said lamp. As shown, the side walls $11^a$, $11^b$ are provided with grooves 46, in which the shield 45 is mounted slidably and detachably, said shield being provided with apertures 47 to permit the passage to the prism $P^1$ of the beams of light reflected by the surfaces $R^1$, $R^2$.

If the sample is of very low reflective power, or if it is desired to obtain a finer comparison, a revolving sector 48 may be interposed in the beam from the surface $R^1$ of the comparison standard, and between such surface and the ray directing prism $P^1$. As shown in Figs. 6 and 7 I provide a standard 49, said standard being adapted to support the small electric motor 50, to the armature shaft of which the sector 48 is secured Any suitable means may be employed to move the sector into and out of the path of the beam from the surface $R^1$, as shown the sector is detachably secured to the motor shaft by the knurled lock nut 51. The sector is preferably constructed so that the readings of the photometer scale when the sector is used will represent one-tenth of the indicated values so that when the sector is used micrometric readings may be made directly from said scale. A second standard 52 may also be provided from the side of the collimator opposite to the standard 49 so that a testing sector may be used for testing the instrument.

For the purpose of investigating or comparing the transmissive properties of substances, as for example liquids, I provide a pair of standards 53, 54 adapted to support the containers for such substances in the path of the beams from the surfaces $R^1$, $R^2$, respectively; any suitable containers, such as vials or tubes having glass or other transparent stoppers may be provided for holding liquids. When transmissive properties are to be investigated, magnesium carbonate will ordinarily be employed for both of the reflecting surfaces.

It will be seen that an instrument constructed in accordance with the principles hereinbefore described is exceptionally simple; the movement of the photometer lamp is positive and the position of said lamp with respect to the reflecting surfaces $R^1$, $R^2$, provides an accurate means for determining the reflective power of such surfaces according to the well known law of the squares of the distances between the lamp and surfaces. The manufacture of a scale to indicate directly the value of such squares is comparatively simple and inexpensive, and as the scale and its index are at all times fixed relatively to the members whose position they indicate, without requiring the interposition of any moving mechanical parts between such members and the indicating means, all errors due to the use of such moving parts are avoided. Obviously any suitable means may be employed for varying the relative positions of the lamp and reflecting surfaces, and as the readings depend on the positions of these parts and not on the means for moving them, no great amount of accuracy is required in the machining or construction of such means.

The same is also true with respect to the spectrometer, it being obvious that the movement of the wedge is positive and direct, and that the wave length scale and index are positively located and fixed with respect to the members whose position they indicate. As the sleeve 36 which carries the wedge is of considerable length the amount of error caused by tilting of the sleeve due to lost motion between it and the sleeve, obviously would be negligible.

In Figs. 8 to 11 inclusive a slightly different constructional example for the spectrometer is shown; the principle of maintaining a fixed relationship between collimator, dispersion prism, and telescope having a fixed ocular aperture being the same as shown and described in connection with Figs. 2 to 7. Instead of relying upon a movement of the optical wedge longitudinally of the axis of the telescope as in Figs. 2 to 7, a pair of wedges W¹, W² suitably supported for relative rotational adjustment are mounted between the dispersion prism P² and the telescope and the dispersion prism P² is set to project the dispersed beam along the optical axis of the telescope instead of below said axis. The wedges W¹, W² are identical in construction so that when they are placed oppositely to each other as shown in Fig. 8, no deviation of the beam will occur, and therefore the central or green portion of the spectrum will be visible at the slit S². When the wedges are in the position shown in Fig. 9, the maximum downward deviation of the beam is secured, while shown in Fig. 10 maximum upward deviation is produced. It will thus be obvious that by the rotation of the wedges between the positions shown in Figs. 9 and 10, the beam will be moved transversely or laterally of the optical aperture, thereby enabling any portion of the spectrum to be investigated. Any suitable means may be employed for mounting and adjusting the wedges W¹, W², as shown in Fig. 11. I may provide the telescope T with a sleeve 60 projecting forwardly thereof and terminating in an enlargement or housing 61. Rotatably mounted within said housing are a pair of bevel gears 62, 63 in which the wedges W¹, W² are seated. A bevel pinion 64 mounted on one end of a short shaft 65, is interposed between and in mesh with the gears 62, 63 and the outer end of said shaft 65 is provided with a knurled operating handle 66. A pointer 67 and a suitable scale 68 graduated in wave lengths, may obviously be provided for determining, by a direct reading, the wave length of the portion of the beam brought into coincidence with the ocular aperture.

It will thus be seen that my improved instrument fully meets the requirements hereinbefore enumerated. It will be understood that many changes, variations and modifications of the constructional details of the illustrated embodiment may be resorted to without departing from the principles of my invention.

I claim:

1. In an instrument of the character set forth, a pair of reflecting surfaces, arranged in spaced parallel relationship, a source of light located between said surfaces, means to vary the distances between said source of light and said surfaces, and an optical prism arranged to collect a portion of the light reflected by said surfaces and to direct said light in a pair of substantially parallel juxtaposed beams along a predetermined path.

2. In an instrument of the character set forth, a pair of reflecting surfaces, arranged in spaced parallel relationship, a source of light located between said surfaces, means to vary the distances between said source of light and said surfaces, an optical prism arranged to collect a portion of the light reflected by said surfaces and to direct said light in a pair of substantially parallel juxtaposed beams along a predetermined path, and indicating means positively fixed and located relatively to said source of light and said reflecting surfaces, said indicating means being constructed and arranged to furnish direct readings indicative of the relative intensities of the light rays incident on said surfaces.

3. In an instrument of the character set forth, a support, a pair of spaced holders mounted on said support for detachably holding a pair of substances to be compared, a carriage mounted on said support for slidable movement between said holders, a source of light mounted on said carriage; and a graduated scale and a pointer, one secured to said carriage and the other to said support, said scale being provided with marks to indicate the position of said source of light relatively to said holders.

4. In an instrument of the character set forth; a collimator, a telescope and a dispersion prism secured in fixed relationship to each other, said telescope being provided with an ocular slit and means movably supported on said telescope to bring different portions of a dispersed beam of light passed through said prism into coincidence with said ocular slit.

5. In an instrument of the character set forth, a support; a collimator, a telescope having a fixed ocular aperture and a dispersion prism secured to said support in fixed relationship to each other, and optical means movably supported on said telescope to bring different portions of a dispersed beam of light passed through said prism into coincidence with said ocular aperture.

6. In an instrument of the character set forth, a dispersion prism, and a telescope fixed against movement relatively to each other, means to direct a beam of light through said prism to said telescope, said telescope being provided with an ocular aperture, and means movable relatively to said telescope to bring different portions of the beam dispersed by said prism into coincidence with said aperture.

7. In an instrument of the character set forth, a dispersion prism and a telescope fixed against movement relatively to each other, means to direct a beam of light through said prism to said telescope, said telescope being provided with a fixed ocular aperture, an optical wedge mounted in said telescope, and means to permit relative movement between said wedge and aperture whereby different portions of the beam dispersed by said prism may be brought into coincidence with said aperture.

8. In an instrument of the character set forth, a dispersion prism and a telescope fixed against movement relatively to each other, means to direct a beam of light through said prism to said telescope, said telescope being provided with an ocular aperture, and an optical wedge mounted for sliding movement longitudinally of said telescope, said wedge being constructed and arranged to cause the longitudinal movement thereof to move the spectrum of said beam transversely across said aperture.

9. In an instrument of the character set forth, a dispersion prism and a telescope fixed against movement relatively to each other, means to direct a beam of light through said prism to said telescope, said telescope being provided with an ocular aperture, an optical wedge mounted within said telescope for longitudinal sliding movement and arranged to bring any portion of the entire spectrum of the beam dispersed by said prism into coincidence with said ocular aperture.

10. In an instrument of the character set forth, a dispersion prism, and a telescope fixed against movement relatively to each other, means to direct a beam of light through said prism to said telescope, said telescope being provided with an ocular aperture, an optical wedge movable relatively to said telescope for selectively bringing any portion of the spectrum of the beam dispersed by said prism into coincidence with said aperture; and a scale and pointer secured respectively to said telescope and wedge for indicating directly the wave length of the light rays brought into coincidence with said aperture.

11. In an instrument of the character set forth, a dispersing prism and a telescope fixed against movement relatively to each other, means for passing a beam of light through said prism to said telescope, a sleeve mounted upon said telescope for longitudinal sliding movement and an optical wedge secured within said sleeve for causing the rays of light dispersed by said prism to be deflected at an angle to the axis of said telescope.

12. In an instrument of the character set forth, a pair of reflecting surfaces, arranged in spaced parallel relationship, a source of light located between said surfaces, means to vary the distances between said source of light and said surfaces, an optical prism arranged to collect a portion of the light reflected by said surfaces and to direct said light in a pair of substantially parallel juxtaposed beams along a predetermined path, and indicating means positively fixed and located relatively to said source of light and said reflecting surfaces, said indicating means being constructed and arranged to furnish a direct reading of the relative intensities of the beams incident on said surfaces and a sectored rotatable disc interposed between said prism and one of said surfaces to intercept a predetermined proportion of the light of one of said beams and thereby enable a micrometric reading to be obtained from said scale and pointer.

13. In an instrument of the character set forth consisting of a spectrometer and a photometer, said photometer comprising a source of light, a pair of reflecting surfaces, and means to vary the relative positions of said surfaces and source of light, an optical prism to direct a portion of the light reflected by said surfaces to said spectrometer in a pair of substantially parallel juxtaposed beams, and said spectrometer comprising a dispersion prism and a telescope fixed against movement relatively to each other, and means to examine selectively portions of the spectrums of said beams, said means including an optical wedge mounted within said telescope for longitudinal sliding movement; said photometer and spectrometer each being provided with a graduated scale and a cooperating pointer constructed and arranged to furnish directly comparative data of the brightness and wave length of the beams incident on said surfaces.

14. In an instrument of the character set forth, a photometer and a spectrometer mounted upon a common support in fixed optical relationship to each other, said photometer including a source of light, a pair of reflecting surfaces, means for varying the distances between said source of light and said surfaces, and a scale and a pointer positively fixed and located relatively to said source of light and said surfaces, said scale being graduated to furnish a direct reading indicative of the relative intensities of the light incident on said surfaces; said spectrometer including a telescope and a dispersion prism fixed against movement relatively to each other, an optical wedge mounted for movement relatively to said telescope to enable any portion of the spectrum to be viewed selectively, and a scale and a pointer positively fixed and located relatively to said telescope and wedge, and being constructed and arranged to indicate directly the wave length of the light rays of the portion of the spectrum brought into view.

15. A spectrophotometer comprising a pair of reflecting surfaces, a source of light arranged between said reflecting surfaces and movable relatively thereto, a collimator, a ray directing prism to direct a portion of the light reflected by said surfaces in two substantially parallel juxtaposed beams into said collimator, a dispersing prism and a telescope fixed against movement relatively to each other, and an optical wedge mounted within said telescope for sliding movement longitudinally thereof.

16. In an instrument of the character set forth, a collimator, a dispersion prism and a telescope having a fixed ocular aperture, fixed against movement relatively to each other, and optical means movable relatively to said telescope to move the beam dispersed by said prism transversely of said ocular aperture and bring different portions of the spectrum into coincidence with said aperture.

In testimony whereof I have hereunto set my hand.

CARL W. KEUFFEL.